United States Patent
Kim et al.

(10) Patent No.: US 10,616,876 B2
(45) Date of Patent: Apr. 7, 2020

(54) METHOD FOR TRANSMITTING CONTROL INFORMATION IN DISTRIBUTED ANTENNA COMMUNICATION SYSTEM, AND APPARATUS THEREFOR

(71) Applicant: LG ELECTRONICS INC., Seoul (KR)

(72) Inventors: Heejin Kim, Seoul (KR); Jiwon Kang, Seoul (KR); Heejeong Cho, Seoul (KR); Genebeck Hahn, Seoul (KR); Ilmu Byun, Seoul (KR); Hyunjin Shim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/094,873

(22) PCT Filed: Oct. 17, 2016

(86) PCT No.: PCT/KR2016/011644
§ 371 (c)(1),
(2) Date: Oct. 18, 2018

(87) PCT Pub. No.: WO2017/183780
PCT Pub. Date: Oct. 26, 2017

(65) Prior Publication Data
US 2019/0132822 A1    May 2, 2019

Related U.S. Application Data

(60) Provisional application No. 62/326,024, filed on Apr. 22, 2016.

(51) Int. Cl.
*H04W 72/04* (2009.01)
*H04B 7/0456* (2017.01)
(Continued)

(52) U.S. Cl.
CPC ........ *H04W 72/042* (2013.01); *H04B 7/0452* (2013.01); *H04B 7/0456* (2013.01);
(Continued)

(58) Field of Classification Search
CPC .................................................. H04W 72/042
See application file for complete search history.

(56) References Cited

U.S. PATENT DOCUMENTS

| | | | |
|---|---|---|---|
| 2010/0234071 | A1 | 9/2010 | Shabtay et al. |
| 2011/0105184 | A1* | 5/2011 | Piirainen ................ H04B 7/022 455/562.1 |
| 2016/0366687 | A1* | 12/2016 | Guo ....................... H04L 1/1812 |

FOREIGN PATENT DOCUMENTS

| | | |
|---|---|---|
| WO | 2011099765 | 8/2011 |
| WO | 2015167314 | 11/2015 |
| WO | 2016013826 | 1/2016 |

OTHER PUBLICATIONS

European Patent Office Application Serial No. 16899548.8, Search Report dated Sep. 25, 2019, 6 pages.
(Continued)

*Primary Examiner* — John D Blanton
(74) *Attorney, Agent, or Firm* — Lee, Hong, Degerman, Kang & Waimey

(57) ABSTRACT

The present application provides a method for transmitting, by an eNodeB, control information to a user equipment including distributed antenna units and a central unit for controlling the distributed antenna units, in a wireless communication system. Particularly, the control information transmission method may comprise the steps of: transmitting distributed antenna unit-common control information which is scrambled by a first identifier; and transmitting distributed antenna unit-specific control information which is scrambled by a second identifier, wherein the first identifier is an identifier of the user equipment, and the second
(Continued)

identifier is a predetermined value which is determined on the basis of the identifier of the user equipment and an index of each of the distributed antenna units.

11 Claims, 11 Drawing Sheets

(51) Int. Cl.
    *H04B 7/0452*    (2017.01)
    *H04W 8/22*      (2009.01)
    *H04W 88/08*    (2009.01)

(52) U.S. Cl.
    CPC ........... *H04W 8/22* (2013.01); *H04W 72/048* (2013.01); *H04W 88/085* (2013.01)

(56) References Cited

OTHER PUBLICATIONS

PCT International Application No. PCT/KR2016/011644, Written Opinion of the International Searching Authority dated Jan. 26, 2017, 16 pages.
Huawei, et al., "Introduction of Rel 13 features for SC-PTM", 3GPP TSG RAN WG1 Meeting #83, R1-157325, Nov. 2015, 4 pages.
Ericsson, "Contents of Downlink Control Information for V2V over PC5", 3GPP TSG RAN WG1 Meeting #84bis, R1-162828, Apr. 2016, 4 pages.
Ericsson, "Physical Layer Design Aspects of UL 256QAM", 3GPP TSG RAN WG1 Meeting #84bis, R1-163347, Apr. 2016, 4 pages.

\* cited by examiner (A) CONTROL-PLANE PROTOCOL STACK (B) USER-PLANE PROTOCOL STACK CRC of Control info for each RU
is scrambled by f (C-RNTI, RU-ID)

METHOD FOR TRANSMITTING CONTROL INFORMATION IN DISTRIBUTED ANTENNA COMMUNICATION SYSTEM, AND APPARATUS THEREFOR

CROSS-REFERENCE TO RELATED APPLICATIONS

This application is the National Stage filing under 35 U.S.C. 371 of International Application No. PCT/KR2016/011644, filed on Oct. 17, 2016, which claims the benefit of U.S. Provisional Application No. 62/326,024, filed on Apr. 22, 2016, the contents of which are all hereby incorporated by reference herein in their entirety.

TECHNICAL FIELD

The present disclosure relates to a wireless communication system. More particularly, the present disclosure relates to a method for transmitting control information in a distributed antenna communication system and a device for performing the same.

BACKGROUND ART

3GPP LTE (3rd generation partnership project long term evolution hereinafter abbreviated LTE) communication system is schematically explained as an example of a wireless communication system to which the present invention is applicable.

FIG. 1 is a schematic diagram of E-UMTS network structure as one example of a wireless communication system. E-UMTS (evolved universal mobile telecommunications system) is a system evolved from a conventional UMTS (universal mobile telecommunications system). Currently, basic standardization works for the E-UMTS are in progress by 3GPP. E-UMTS is called LTE system in general. Detailed contents for the technical specifications of UMTS and E-UMTS refers to release 7 and release 8 of "3rd generation partnership project; technical specification group radio access network", respectively.

Referring to FIG. 1, E-UMTS includes a user equipment (UE), an eNode B (eNB), and an access gateway (hereinafter abbreviated AG) connected to an external network in a manner of being situated at the end of a network (E-UTRAN). The eNode B may be able to simultaneously transmit multi data streams for a broadcast service, a multicast service and/or a unicast service.

One eNode B contains at least one cell. The cell provides a downlink transmission service or an uplink transmission service to a plurality of user equipments by being set to one of 1.25 MHz, 2.5 MHz, 5 MHz, 10 MHz, 15 MHz, and 20 MHz of bandwidths. Different cells can be configured to provide corresponding bandwidths, respectively. An eNode B controls data transmissions/receptions to/from a plurality of the user equipments. For a downlink (hereinafter abbreviated DL) data, the eNode B informs a corresponding user equipment of time/frequency region on which data is transmitted, coding, data size, HARQ (hybrid automatic repeat and request) related information and the like by transmitting DL scheduling information. And, for an uplink (hereinafter abbreviated UL) data, the eNode B informs a corresponding user equipment of time/frequency region usable by the corresponding user equipment, coding, data size, HARQ-related information and the like by transmitting UL scheduling information to the corresponding user equipment. Interfaces for user-traffic transmission or control traffic transmission may be used between eNode Bs. A core network (CN) consists of an AG (access gateway) and a network node for user registration of a user equipment and the like. The AG manages a mobility of the user equipment by a unit of TA (tracking area) consisting of a plurality of cells.

Wireless communication technologies have been developed up to LTE based on WCDMA. Yet, the ongoing demands and expectations of users and service providers are consistently increasing. Moreover, since different kinds of radio access technologies are continuously developed, a new technological evolution is required to have a future competitiveness. Cost reduction per bit, service availability increase, flexible frequency band use, simple structure/open interface and reasonable power consumption of user equipment and the like are required for the future competitiveness.

DISCLOSURE

Technical Problem

Based on the above discussion, a method for transmitting control information in a distributed antenna communication system and a device for performing the method are proposed.

Technical Solution

In one aspect of the present disclosure, there is provided a method for transmitting, by a base station, control information to a user equipment in a wireless communication system, wherein the user equipment includes distributed antenna units, and a central unit for controlling the distributed antenna units, wherein the method comprises: transmitting distributed antenna units-common control information scrambled by a first identifier; and transmitting distributed antenna units-specific control information scrambled by a second identifier, wherein the first identifier is an identifier of the user equipment, wherein the second identifier is a specific value determined based on the identifier of the user equipment and an index of each of the distributed antenna units.

In another aspect of the present disclosure, there is provided a method for receiving, by an user equipment, control information from a base station in a wireless communication system, wherein the user equipment includes distributed antenna units, and a central unit for controlling the distributed antenna units, wherein the method comprises: receiving distributed antenna units-common control information scrambled by a first identifier; and receiving distributed antenna units-specific control information scrambled by a second identifier, wherein the first identifier is an identifier of the user equipment, wherein the second identifier is a specific value determined based on the identifier of the user equipment and an index of each of the distributed antenna units.

In one embodiment, the distributed antenna units-common control information is detected by each of the distributed antenna units using the first identifier. In one embodiment, the distributed antenna units-common control information is detected by the central unit using the first identifier, and then the detected distributed antenna unit-common control information is transmitted to at least one of the distributed antenna units. In one embodiment, the distributed antenna units-specific control information is detected by each of the distributed antenna units using the second identifier.

In one embodiment, the user equipment and the base station may exchange information about the index of each of the distributed antenna units.

In still another aspect of the present disclosure, there is provided a user equipment in a wireless communication system, wherein the user equipment comprises: distributed antenna units; and a central unit for controlling the distributed antenna units, wherein the control unit is configured to detect distributed antenna units-common control information scrambled by a first identifier and to transmit the detected distributed antenna units-common control information to the distributed antenna units, wherein each of the distributed antenna units is configured to detect distributed antenna units-specific control information scrambled by a second identifier, wherein the first identifier is an identifier of the user equipment, wherein the second identifier is a specific value determined based on the identifier of the user equipment and an index of each of the distributed antenna units. In one embodiment, the distributed antenna units-common control information is detected by each of the distributed antenna units using the first identifier.

Advantageous Effects

According to an embodiment of the present disclosure, control information may be efficiently transmitted and received in a distributed antenna communication system.

It will be appreciated by persons skilled in the art that that the effects that can be achieved through the present invention are not limited to what has been particularly described hereinabove and other advantages of the present invention will be more clearly understood from the following detailed description.

BEST MODE FOR CARRYING OUT THE INVENTION

The configuration, operation and other features of the present invention will be understood by the embodiments of the present invention described with reference to the accompanying drawings. The following embodiments are examples of applying the technical features of the present invention to a 3rd Generation Partnership Project (3GPP) system.

Although, for convenience, the embodiments of the present invention are described using the LTE system and the LTE-A system in the present specification, the embodiments of the present invention are applicable to any communication system corresponding to the above definition. In addition, although the embodiments of the present invention are described based on a Frequency Division Duplex (FDD) scheme in the present specification, the embodiments of the present invention may be easily modified and applied to a Half-Duplex FDD (H-FDD) scheme or a Time Division Duplex (TDD) scheme.

In addition, in the present specification, the term "base station" may include a remote radio head (RRH), an eNB, a transmission point (TP), a reception point (RP), a relay, etc.

Figure 1:
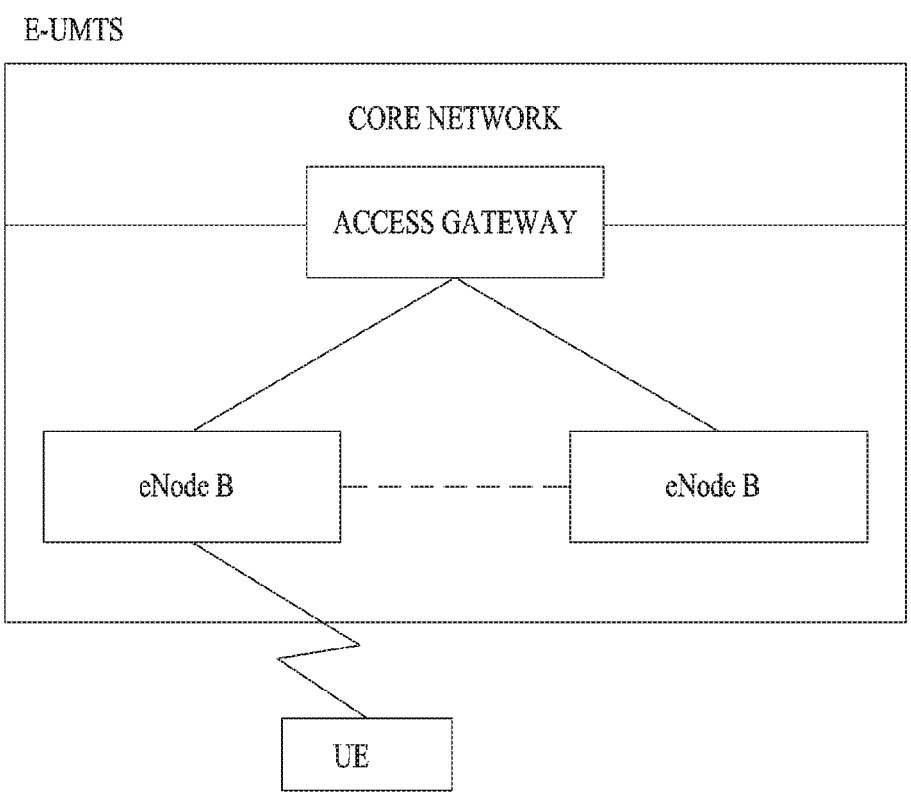
FIG. 1 is a diagram showing a network structure of an Evolved Universal Mobile Telecommunications System (E-UMTS) as an example of a wireless communication system.
Figure 2:
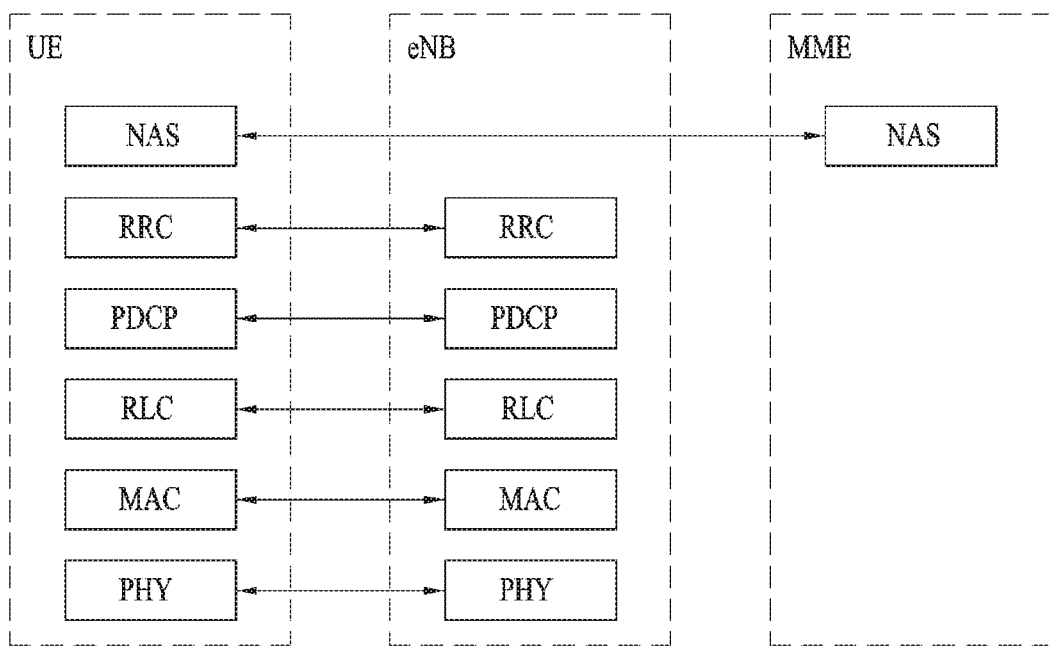
FIG. 2 is a diagram showing a control plane and a user plane of a radio interface protocol architecture between a User Equipment (UE) and an Evolved Universal Terrestrial Radio Access Network (E-UTRAN) based on a 3rd Generation Partnership Project (3GPP) radio access network standard.
Figure 2:
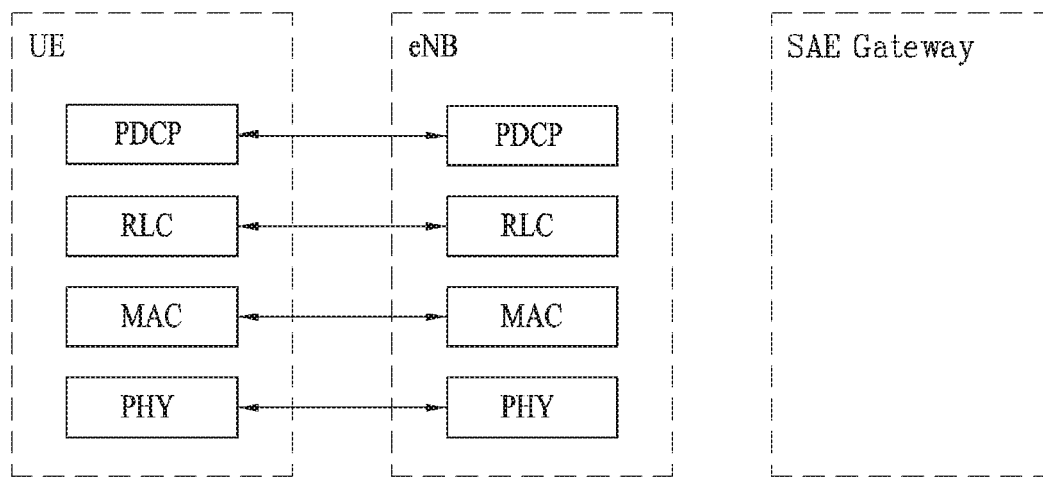

FIG. 2 shows a control plane and a user plane of a radio interface protocol between a UE and an Evolved Universal Terrestrial Radio Access Network (E-UTRAN) based on a 3GPP radio access network standard. The control plane refers to a path used for transmitting control messages used for managing a call between the UE and the network. The user plane refers to a path used for transmitting data generated in an application layer, e.g., voice data or Internet packet data.

A physical (PHY) layer of a first layer provides an information transfer service to a higher layer using a physical channel. The PHY layer is connected to a Medium Access Control (MAC) layer located on a higher layer via a transport channel. Data is transported between the MAC layer and the PHY layer via the transport channel. Data is also transported between a physical layer of a transmitting side and a physical layer of a receiving side via a physical channel. The physical channel uses a time and a frequency as radio resources. More specifically, the physical channel is modulated using an Orthogonal Frequency Division Multiple Access (OFDMA) scheme in downlink and is modulated using a Single-Carrier Frequency Division Multiple Access (SC-FDMA) scheme in uplink.

A Medium Access Control (MAC) layer of a second layer provides a service to a Radio Link Control (RLC) layer of a higher layer via a logical channel. The RLC layer of the second layer supports reliable data transmission. The function of the RLC layer may be implemented by a functional block within the MAC. A Packet Data Convergence Protocol (PDCP) layer of the second layer performs a header compression function to reduce unnecessary control information for efficient transmission of an Internet Protocol (IP) packet such as an IPv4 packet or an IPv6 packet in a radio interface having a relatively small bandwidth.

A Radio Resource Control (RRC) layer located at the bottom of a third layer is defined only in the control plane and is responsible for control of logical, transport, and physical channels in association with configuration, re-configuration, and release of Radio Bearers (RBs). The RB is a service that the second layer provides for data communication between the UE and the network. To accomplish this, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode. A Non-Access Stratum (NAS) layer located above the RRC layer performs functions such as session management and mobility management.

A single cell configuring a base station (eNB) provides a downlink or uplink transmission service to several UEs by being set to one of bandwidths such as 1.25 Mhz, 2.5 Mhz, 5 Mhz, 10 Mhz, 15 Mhz, 20 Mhz and the like. Different cells may be configured to provide different bandwidths, respectively.

Downlink transport channels for transmission of data from the network to the UE include a Broadcast Channel (BCH) for transmission of system information, a Paging Channel (PCH) for transmission of paging messages, and a downlink Shared Channel (SCH) for transmission of user traffic or control messages. Traffic or control messages of a downlink multicast or broadcast service may be transmitted through a downlink SCH and may also be transmitted through a downlink multicast channel (MCH). Uplink transport channels for transmission of data from the UE to the network include a Random Access Channel (RACH) for transmission of initial control messages and an uplink SCH for transmission of user traffic or control messages. Logical channels, which are located above the transport channels and are mapped to the transport channels, include a Broadcast Control Channel (BCCH), a Paging Control Channel (PCCH), a Common Control Channel (CCCH), a Multicast Control Channel (MCCH), and a Multicast Traffic Channel (MTCH).

Figure 3:
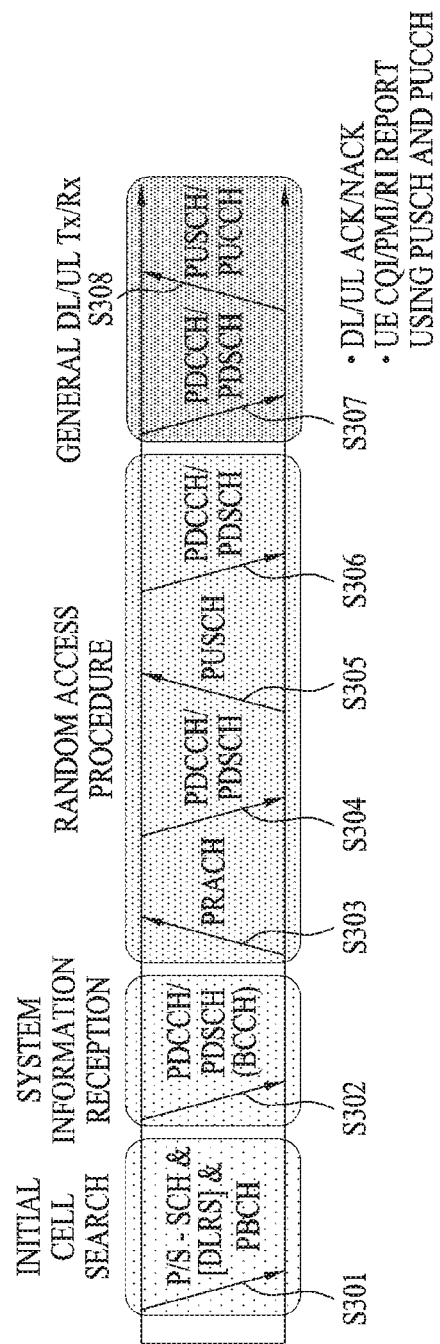
FIG. 3 is a diagram showing physical channels used in a 3GPP system and a general signal transmission method using the same.

FIG. 3 is a diagram showing physical channels used in a 3GPP system and a general signal transmission method using the same.

A UE performs an initial cell search operation such as synchronization with an eNB when power is turned on or the UE enters a new cell (S301). The UE may receive a Primary Synchronization Channel (P-SCH) and a Secondary Synchronization Channel (S-SCH) from the eNB, perform synchronization with the eNB, and acquire information such as a cell ID. Thereafter, the UE may receive a physical broadcast channel from the eNB so as to acquire broadcast information within the cell. Meanwhile, the UE may receive a Downlink Reference Signal (DL RS) so as to confirm a downlink channel state in the initial cell search step.

The UE, which has completed the initial cell search, may receive a Physical Downlink Control Channel (PDCCH) and a Physical Downlink Shared Channel (PDSCH) according to information included in the PDCCH so as to acquire more detailed system information (S302).

Meanwhile, if the eNB is initially accessed or radio resources for signal transmission are not present, the UE may perform a Random Access Procedure (RACH) (step S303 to S306) with respect to the eNB. In this case, the UE may transmit a specific sequence through a Physical Random Access Channel (PRACH) as a preamble (S303 and S305), and receive a response message of the preamble through the PDCCH and the PDSCH corresponding thereto (S304 and S306). In the case of contention-based RACH, a contention resolution procedure may be further performed.

The UE, which has performed the above procedures, may perform PDCCH/PDSCH reception (S307) and Physical Uplink Shared Channel PUSCH)/Physical Uplink Control Channel (PUCCH) transmission (S308) as a general uplink/downlink signal transmission procedure. In particular, the UE receives downlink control information (DCI) through a PDCCH. Here, the DCI includes control information such as resource allocation information of the UE and the format thereof differs according to the use purpose.

The control information transmitted from the UE to the eNB in uplink or transmitted from the eNB to the UE in downlink includes a downlink/uplink ACK/NACK signal, a Channel Quality Indicator (CQI), a Precoding Matrix Index (PMI), a Rank Indicator (RI), and the like. In the case of the 3GPP LTE system, the UE may transmit the control information such as CQI/PMI/RI through the PUSCH and/or the PUCCH.

Figure 4:
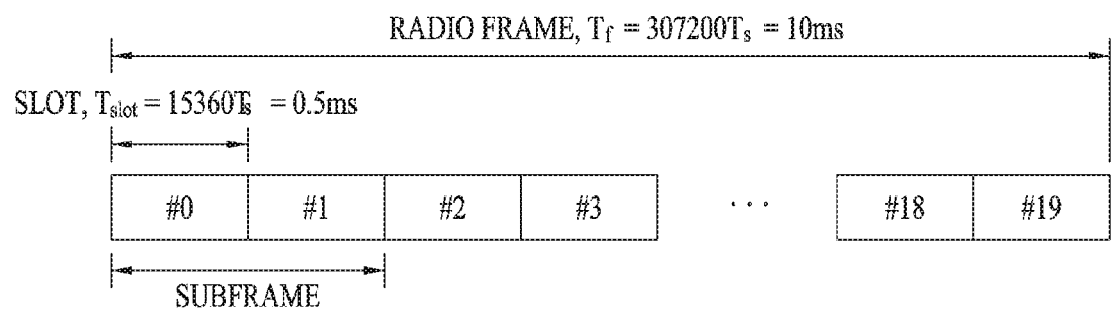
FIG. 4 is a diagram showing the structure of a radio frame used in a Long Term Evolution (LTE) system.

FIG. 4 is a diagram showing the structure of a radio frame used in a Long Term Evolution (LTE) system.

Referring to FIG. 4, the radio frame has a length of 10 ms ($327200 \times T_s$) and includes 10 subframes with the same size. Each of the subframes has a length of 1 ms and includes two slots. Each of the slots has a length of 0.5 ms ($15360 \times T_s$). $T_s$ denotes a sampling time, and is represented by $T_s=1/(15 \text{ kHz} \times 2048)=3.2552 \times 10^{-8}$ (about 33 ns). Each slot includes a plurality of OFDM symbols in a time domain, and includes a plurality of resource blocks (RBs) in a frequency domain. In the LTE system, one RB includes 12 subcarriers×7(6) OFDM or SC-FDMA symbols. A Transmission Time Interval (TTI) which is a unit time for transmission of data may be determined in units of one or more subframes. The structure of the radio frame is only exemplary and the number of subframes included in the radio frame, the number of slots included in the subframe, or the number of OFDM symbols included in the slot may be variously changed.

Figure 5:
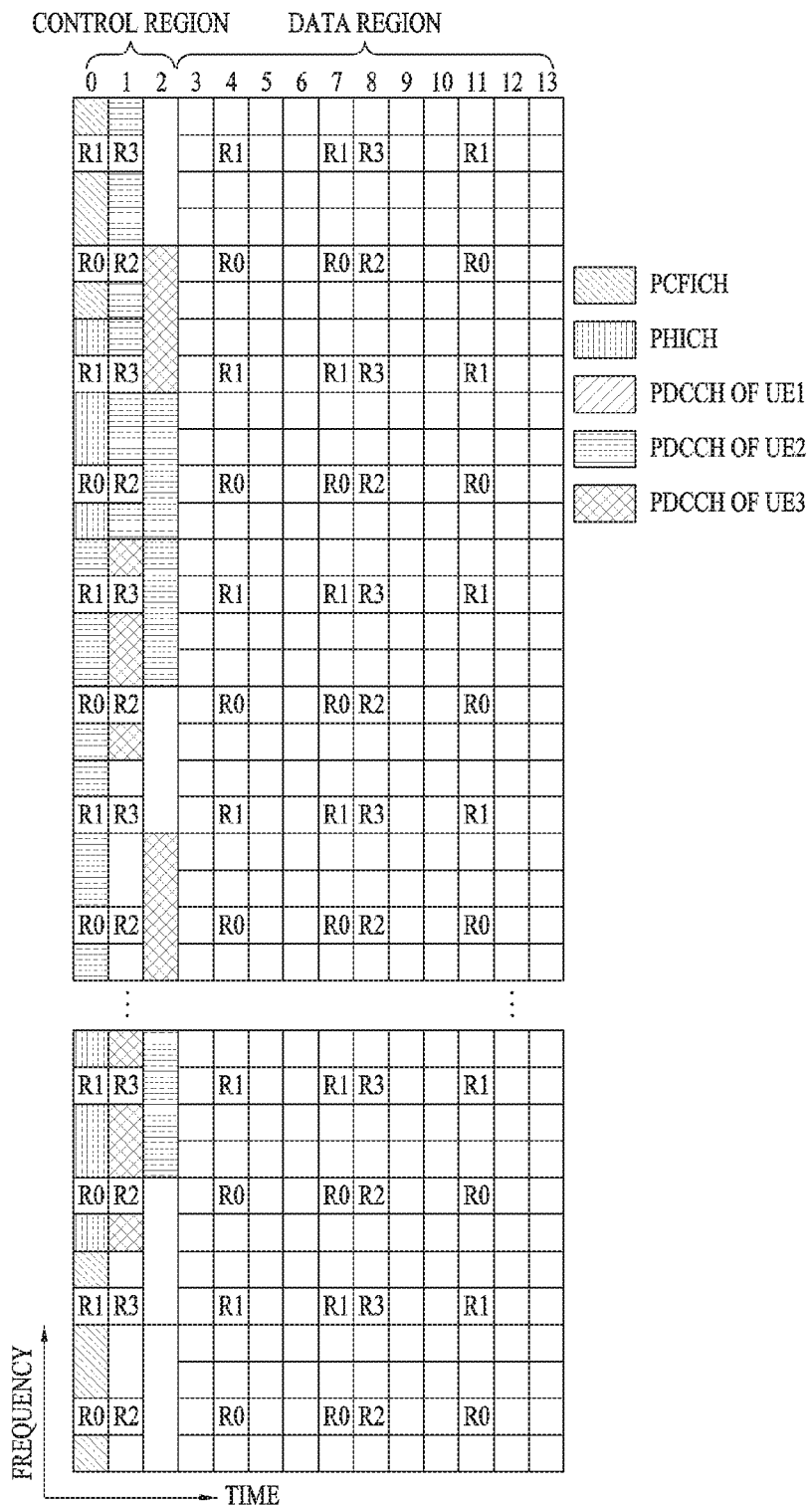
FIG. 5 is a diagram showing the structure of a downlink radio frame used in an LTE system.

FIG. 5 is a diagram showing a control channel included in a control region of one subframe in a downlink radio frame.

Referring to FIG. 5, a subframe includes 14 OFDM symbols. The first to third OFDM symbols are used as a control region and the remaining 13 to 11 OF-DM symbols are used as a data region, according to subframe configuration. In FIG. 5, R1 to R4 denote reference signals (RS) or pilot signals for antennas 0 to 3. The RS is fixed to a constant pattern within a subframe regardless of the control region and the data region. A control channel is allocated to resources, to which the RS is not allocated, in the control region, and a traffic channel is also allocated to resources, to which the RS is not allocated, in the control region. Examples of the control channel allocated to the control region include a Physical Control Format Indicator Channel (PCFICH), a Physical Hybrid-ARQ Indicator Channel (PH-ICH), a Physical Downlink Control Channel (PDCCH), etc.

The Physical Control Format Indicator Channel (PC-FICH) informs the UE of the number of OFDM symbols used for the PDCCH per subframe. The PCFICH is located at a first OFDM symbol and is configured prior to the PHICH and the PDCCH. The PCFICH includes four Resource Element Groups (REGs) and the REGs are dispersed in the control region based on a cell identity (ID). One REG includes four resource elements (REs). The PCFICH has a value of 1 to 3 or 2 to 4 according to bandwidth and is modulated using a Quadrature Phase Shift Keying (QPSK) scheme.

The Physical Hybrid-ARQ Indicator Channel (PHICH) is used to carry HARQ ACK/NACK for uplink transmission. That is, the PHICH refers to a channel via which DL ACK/NACK information for uplink HARQ is transmitted. The PHICH includes one REG and is scrambled on a cell-specific basis. ACK/NACK is indicated by one bit and is modulated using a binary phase shift keying (BPSK) scheme. The modulated ACK/NACK is repeatedly spread with a spreading factor (SF) of 2 or 4. A plurality of PHICHs mapped to the same resources configures a PHICH group. The number of PHICHs multiplexed in the PHICH group is determined according to the number of spreading codes. The PHICH (group) is repeated three times in order to obtain diversity gain in a frequency region and/or time region.

The Physical Downlink Control Channel (PDCCH) is allocated to the first n OFDM symbols of a subframe. Here, n is an integer of 1 or more and is indicated by a PCFICH. The PDCCH includes one or more Control Channel Elements (CCEs). The PDCCH informs each UE or a UE group of information associated with resource allocation of a Paging Channel (PCH) and a Downlink-Shared Channel (DL-SCH), both of which are transport channels, uplink scheduling grant, HARQ information, etc. The paging channel (PCH) and the downlink-shared channel (DL-SCH) are transmitted through a PDSCH. Accordingly, the eNB and the UE transmit and receive data through the PDSCH except for specific control information or specific service data.

Information indicating to which UE (one or a plurality of UEs) data of the PDSCH is transmitted and information indicating how the UEs receive and decode the PDSCH data are transmitted in a state of being included in the PDCCH. For example, it is assumed that a specific PDCCH is CRC-masked with a Radio Network Temporary Identity (RNTI) "A", and information about data transmitted using radio resource (e.g., frequency location) "B" and transmission format information (e.g., transmission block size, modulation scheme, coding information, or the like) "C" is transmitted via a specific subframe. In this case, one or more UEs located within a cell monitor a PDCCH using its own RNTI information, and if one or more UEs having "A" RNTI are present, the UEs receive the PDCCH and receive the PDSCH indicated by "B" and "C" through the information about the received PDCCH.

Figure 6:
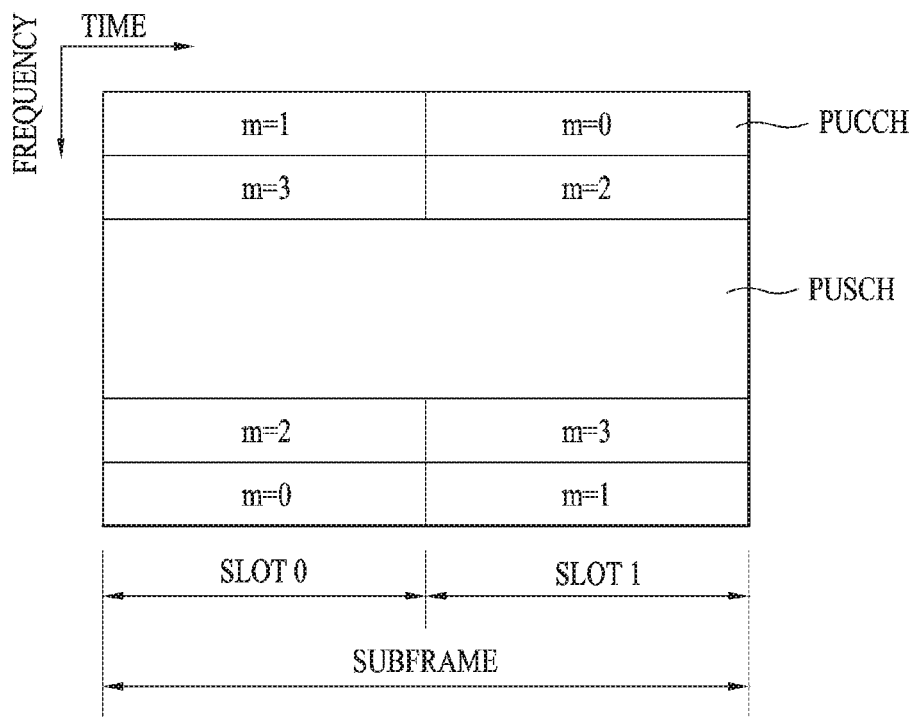
FIG. 6 is a diagram showing the structure of an uplink subframe used in an LTE system.

FIG. 6 is a diagram showing the structure of an uplink subframe used in an LTE system.

Referring to FIG. 6, an uplink subframe may be divided into a region to which a Physical Uplink Control Channel (PUCCH) carrying uplink control information is allocated and a region to which a Physical Uplink Shared Channel (PUSCH) carrying user data is allocated. A middle portion of the subframe is allocated to the PUSCH and both sides of a data region in a frequency domain are allocated to the PUCCH. Uplink control information transmitted on the PUCCH includes an ACK/NACK signal used for HARQ, a Channel Quality Indicator (CQI) indicating a downlink channel status, a rank indicator (RI) for MIMO, a scheduling request (SR) which is an uplink radio resource allocation request, etc. The PUCCH for one UE uses one resource block occupying different frequencies in slots within the subframe. Two slots use different resource blocks (or sub-carriers) within the subframe. That is, two resource blocks allocated to the PUCCH are frequency-hopped in a slot boundary. FIG. 6 shows the case in which a PUCCH having m=0, a PUCCH having m=1, a PUCCH having m=2, and a PUCCH having m=3 are allocated to the subframe.

Hereinafter, a Multiple-Input Multiple-Output (MIMO) system will be described. In the MIMO system, multiple transmission antennas and multiple reception antennas are used. By this method, data transmission/reception efficiency can be improved. That is, since a plurality of antennas is used in a transmitter or a receiver of a wireless communication system, capacity can be increased and performance can be improved. Hereinafter, MIMO may also be called "multi-antenna".

In the multi-antenna technique, a single antenna path is not used for receiving one message. Instead, in the multi-antenna technique, data fragments received via several antennas are collected and combined so as to complete data. If the multi-antenna technique is used, a data transfer rate may be improved within a cell region having a specific size or system coverage may be increased while ensuring a specific data transfer rate. In addition, this technique may be widely used in a mobile communication terminal, a repeater and the like. According to the multi-antenna technique, it is possible to overcome a limit in transmission amount of conventional mobile communication using a single antenna.

Figure 7:
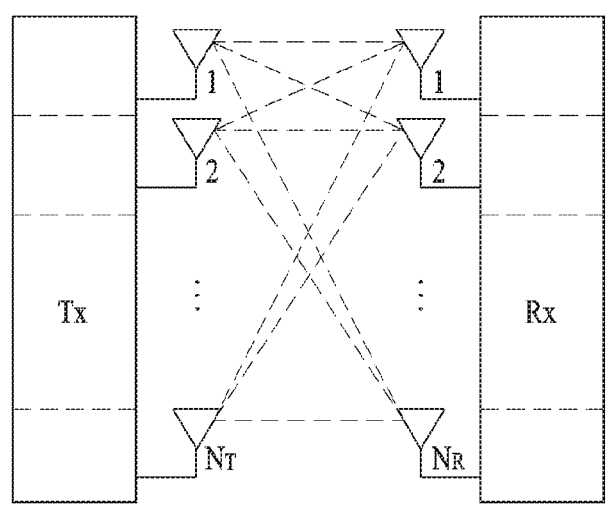
FIG. 7 is a diagram showing the configuration of a general multiple input multiple output (MIMO) system.

The configuration of the general multi-antenna (MIMO) communication system is shown in FIG. 7. $N_T$ transmission antennas are provided in a transmitter and $N_R$ reception antennas are provided in a receiver. If the multiple antennas are used in both the transmitter and the receiver, theoretical channel transmission capacity is increased as compared with the case where multiple antennas are used in only one of the transmitter or the receiver. The increase in the channel transmission capacity is proportional to the number of antennas. Accordingly, transfer rate is improved and frequency efficiency is improved. If a maximum transfer rate in the case where one antenna is used is $R_o$, a transfer rate in the case where multiple antennas are used can be theoretically increased by a value obtained by multiplying $R_o$ by a rate increase ratio $R_i$. Here, $R_i$ is the smaller of the two values $N_T$ and $N_R$.

For example, in a MIMO system using four transmit antennas and four reception antennas, it is possible to theoretically acquire a transfer rate which is four times that of a single antenna system. After the theoretical increase in the capacity of the MIMO system was proved in the mid-1990s, various technologies of substantially improving a data transmission rate have been actively developed up to now. In addition, several technologies are already applied to the various radio communication standards such as the third-generation mobile communication and the next-generation wireless local area network (LAN).

According to the researches into the MIMO antenna up to now, various researches such as researches into information theory related to the computation of the communication capacity of a MIMO antenna in various channel environments and multiple access environments, researches into the model and the measurement of the radio channels of the MIMO system, and researches into space-time signal processing technologies of improving transmission reliability and transmission rate have been actively conducted.

A vehicle-to-vehicle communication system is described on the basis of the aforementioned wireless communication system as follows.

Figure 8:
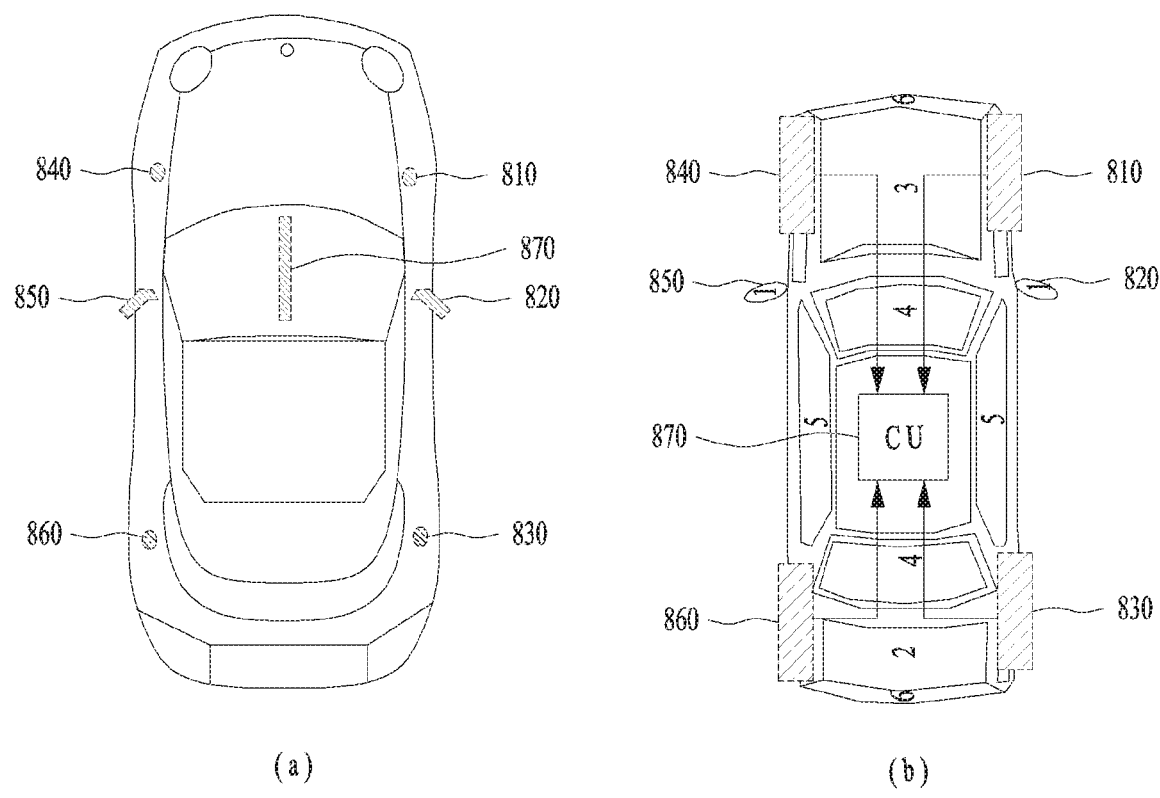
FIG. 8 is a diagram showing a vehicle including a multitude of antenna arrays.

FIG. 8 is a diagram showing a vehicle including a multitude of antenna arrays. The use frequency and the utilization service category of the aforementioned wireless communication system are increasing. Here, the needs for intending to support high Quality of Service (QoS) together with high data throughput or high data rate to a UE or user moving fast unlike the conventional static service are increasing.

For example, in a wireless communication system, the necessity for supporting a wireless service of good quality to currently moving UEs (e.g., a case that a multitude of UEs or users (hereinafter commonly called 'UEs') using public transportation desire to watch multimedia on board, a case that a multitude of UEs on a personal vehicle currently driven on a highway use different wireless communication services, etc.) is increasing.

Yet, the existing wireless communication system may have some limitation put on providing a service to a UE in consideration of fast moving or mobility. In this case, in order to support a service, a system network needs to be improved revolutionarily. Moreover, a new system design may be necessary in a scope of not affecting the existing network infrastructure while maintaining compatibility with the existing network infrastructure.

For example, as a large-size antenna array is installed in a vehicle, the vehicle is made to obtain a large array gain. Hence, despite that the vehicle is moving fast, UEs in the vehicle can be supported with services of good quality. In the vehicle, data received through a Central Unit (CU) can be relayed to UEs in the vehicle. In doing so, in case of using a large-size antenna array, the vehicle can prevent communication performance degradation due to penetration loss having an average value of about 20 dB. Moreover, as the vehicle uses a number of Receiving (Rx) antennas in comparison with the number of UEs using the system, large array gain securement can be facilitated and Rx diversity can be secured through securement of distance between Rx antennas. Namely, through the aforementioned vehicle-to-vehicle MIMO system, it is possible to provide a service to a fast-moving UE without additional design of a network.

Yet, despite the above-mentioned advantages, it is still difficult to apply the vehicle-to-vehicle MIMO system due to vehicle's exterior and manufacturing system establishment and the like. And, since a vehicle is a considerably expensive equipment in comparison with an existing personal portable communication device, it may be difficult to upgrade and update the vehicle. Moreover, more requirements such as design concept, aerodynamic structure and the like as well as communication performance should be met for the vehicle, limitations may be put on aesthetic/aerodynamic vehicle design. For example, in order to eliminate visual inconvenience provided by present antennas, some vehicle manufacturers commonly use a combination antenna of which performance is lower than that of a single antenna.

Yet, in an environment that the development and necessity of a communication system are on the rise, in order to resolve the spatial limitation of a large-size antenna array, a distributed antenna array system for multiple antenna array system implementation tends to be employed gradually and applied in consideration of harmony with a vehicle exterior and the like.

For example, referring to FIG. 8, a plurality of antennas 810, 820, 830, 840, 850 and 860 may be installed in a vehicle. Here, locations and number of a plurality of the antennas 810, 820, 830, 840, 850 and 860 and the like may vary depending on a vehicle design system and each vehicle. Here, the configuration described in the following is identically applicable despite the locations and number of a plurality of the antennas 810, 820, 830, 840, 850 and 860 installed in the vehicle are changed, and non-limited by the following embodiment. Namely, such configuration is applicable to antennas having various shapes and radiation patterns according to the locations of a plurality of the antennas 810, 820, 830, 840, 850 and 860.

In this case, signals for antennas (Distributed antenna Units (DUs) or Remote Units (RUs)) distributively disposed in the vehicle can be controlled through a Central control Unit (CU) 870. Namely, the CU 870 of the vehicle controls signals for the RUs 810, 820, 830, 840, 850 and 860 installed in the vehicle, thereby receiving a signal from a base station by maximizing reception diversity and also preventing a radio access between the base station and the vehicle from being disconnected in a fast moving situation. Namely, the vehicle itself may be a single UE having a plurality of antennas or a relay UE relaying signals. The vehicle can provide services of good quality to a plurality of UEs in a vehicle through control and relay of a signal received through the CU 870.

Figure 9:
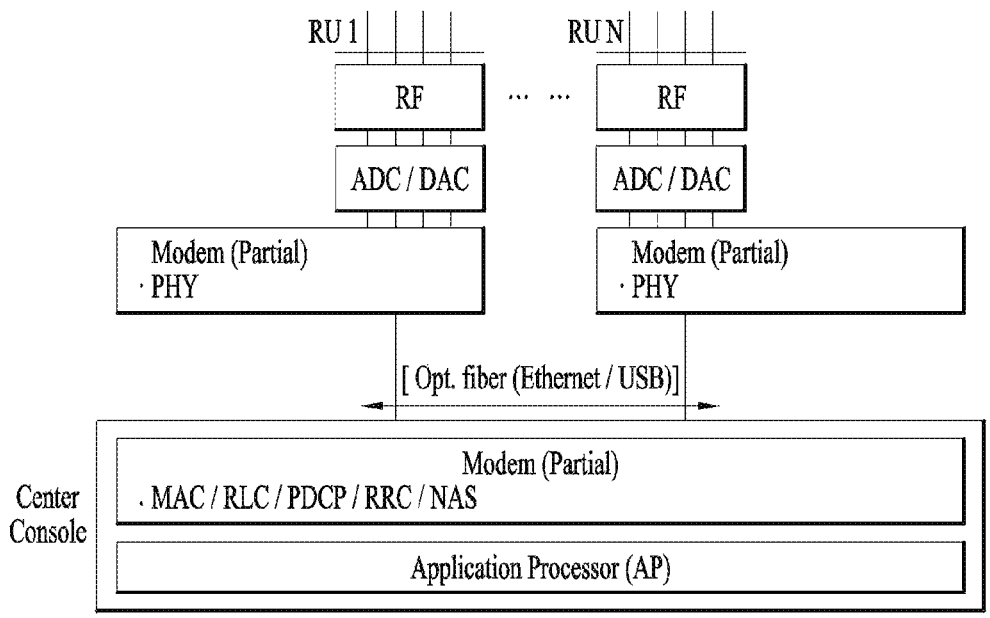
FIG. 9 shows an example of functionality sharing between DU and CU in a vehicle MIMO system.

Generally, in functional/hierarchical aspect of communication, a UE includes RRH including a Radio Frequency (RF) module and Analog Digital Converter/Digital Analog Converter (ADC/DAC), Modem (PHY, MAC, RLC, PDCP, RRC, and NAS included), and Application Processor (AP). The function of a part named DU in the vehicle distributed antenna system has no reason to be limited to only playing a role as an antenna (RF or RRH) module frequently called in function/layer of the UE. Namely, a specific processing can be performed by additionally giving some of functions of the UE to each DU as well as the function of the RF module and a signal through the processing can be brought to the CU from the DU so as to be combined. Therefore, in case of a vehicle antenna system, by appropriately distributing and assigning function/layer modules to the DU and the CU, it is able to obtain implementations gains such as lowering level of difficulty in RF implementation (according to a DU-CU implementation scenario) or resolving a DU-CU cabling issue and the like. In the implementation scenario according to the DU-CU function/layer module distribution, one example of implementation that each DU includes the minimum function of a modem, e.g., a function of a Physical (PHY) layer can be illustrated as FIG. 9.

Through a vehicle distributed antenna system, a vehicle, i.e., a UE can obtain a DL performance gain in comparison with an existing UE through the two kinds of schemes (or, combination of two schemes) as follows.

1. Method of increasing reliability in a manner of receiving the same information (layer) from two or more DUs and then combining reception results of the respective DUs from the same information in CU 2. Method of increasing data throughput in a manner that DUs having large channel orthogonality receives different information (layers), respectively According to the above-described vehicle MIMO system, depending on differences in antenna gain and beam pattern between different RUs disposed in a vehicle or a difference in RU disposed location, although the same preferred beam direction is selected in the same vehicle, definitely different actual DU Rx signal power may be measured actually. For example, an antenna installed at a top end of a vehicle roof is examined as obtaining a 3.4 dB Rx signal power gain in comparison with an antenna installed at a bottom end of a vehicle trunk. In case that an antenna is provided within a vehicle, it is already known that shield loss due to vehicle glass medium is considerable.

Therefore, unlike existing user equipment that receives a single uplink grant and a single downlink grant from a base station, in the case of vehicle user equipment employing distributed antenna technology, new uplink grant and downlink grant configurations and transmission/reception scheme with considering a RU-specific received signal quality are required. This corresponds to newly defining a DCI format including uplink grant and downlink grant transmitted on the PDCCH in the current LTE system.

First Embodiment—Uplink Control Information for Vehicle MIMO System

When a corresponding vehicle to a particular vehicle user equipment is of a UE type vehicle having a plurality of RUs, and when the base station knows RU indexes of individual RUs (which is information that is pre-exchanged between the vehicle and the base station), the base station may consider each RU as in the multi-user. For example, the base station may separately allocate a period and subframe offset for each RU via RRC signaling, and trigger a Sounding Reference Signal (SRS). Further, the base station may grant an uplink grant for each RU of the vehicle user equipment via following two schemes.

(1) First, a scheme may be considered in which the base station assigns uplink grants using an RU-specific individual PDCCH, respectively. Specifically, the base station may transmit an uplink grant to each RU individually using the PDCCH scrambled by a RU index and a ID (e.g., C-RNTI) assigned to the vehicle user equipment from the network. This scheme will be exemplified with reference to the drawing.

Figure 10:
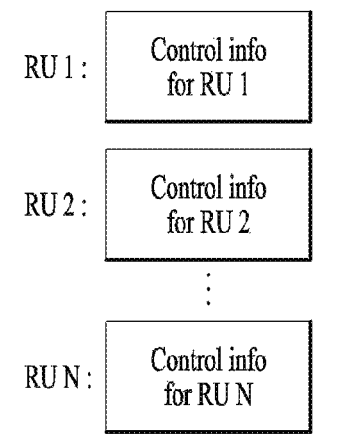
FIG. 10 is a diagram illustrating an example of configuring a RU-specific uplink grant according to a first embodiment of the present disclosure.

FIG. 10 shows an example of RU-specific uplink grant configuration according to a first embodiment of the present disclosure.

Referring to FIG. 10, a scheme may be implemented in which the base station assigns a resource (for example, PDCCH) for control information transmission to each RU, and the base station transmits control information of each RU together with CRC information scrambled by a function f (C-RNTI, RU-ID) which is a function of a UE-ID (e.g., C-RNTI) and RU-ID (information pre-defined between the base station and the vehicle user equipment or provided therebetween via RRC signaling). However, the control information includes control information that is commonly applicable to all RUs and control information that is allocated differently to individual RUs. Thus, there is a problem that the former control information may be mixed with the latter control information.

Figure 11:
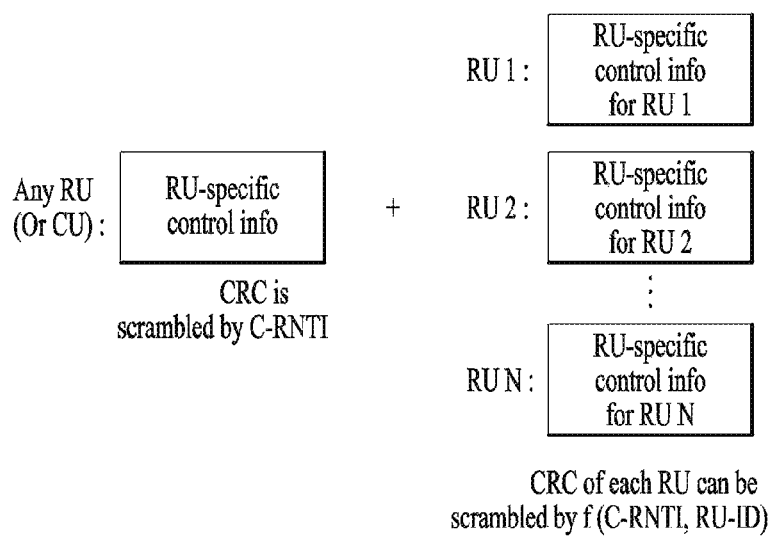
FIG. 11 is a diagram illustrating another example of configuring a RU-specific uplink grant according to a first embodiment of the present disclosure.

FIG. 11 shows another example of configuring an RU-specific uplink grant according to the first embodiment of the present disclosure.

Referring to FIG. 11, the control information that is commonly assigned to the RUs may be transmitted as single information to the entire vehicle user equipment (e.g., a CU). This enables efficient control of the control information payload. That is, since the payload allocated to each PDCCH resource is reduced, this may allow the same effect as reducing a channel coding rate. Thus, the transmission reliability of the control information may be improved. In this connection, the RU-common control information may be decoded by the CU and then forwarded to each RU. Alternatively, each RU may blind-decode the RU-common PDCCH resource and the RU-specific PDCCH resource using two CRC scrambling codes, i.e., C-RNTI and f (C-RNTI, RU) such that the decoded information may be obtained by each RU.

(2) A scheme for providing an aggregated uplink grant to a single vehicle user equipment using one PDCCH resource may also be considered. The base station may transmit the aggregated uplink grant to the vehicle user equipment using the PDCCH scrambled by an ID of the vehicle user equipment such as the C-RNTI. To this end, a new control information format for the aggregated uplink grant for multiple RUs, such as the vehicle user equipment, must be defined. This format will be illustrated with reference to the drawing.

Figure 12:
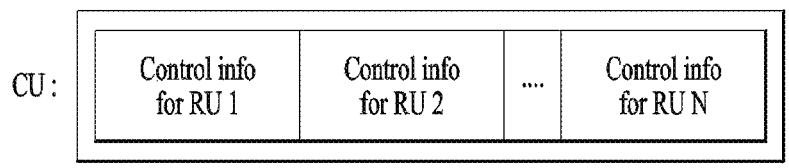
FIG. 12 is a diagram illustrating an example of configuring an aggregated uplink grant according to a first embodiment of the present disclosure.

FIG. 12 shows an example of an aggregated uplink grant configuration according to the first embodiment of the present disclosure.

Referring to FIG. 12, the base station may aggregate control information of all RUs, and scramble the information using a vehicle user equipment ID, and, then, the base station may provide an aggregated uplink grant to a plurality of RUs belonging to one vehicle user equipment. However, since the control information is transmitted via channel coding, a following problem may occur. When the number of bits in the control information itself increases as in the format as shown in FIG. 12, there is a problem that transmission reliability of the control information is reduced when the same channel coding is applied.

Figure 13:
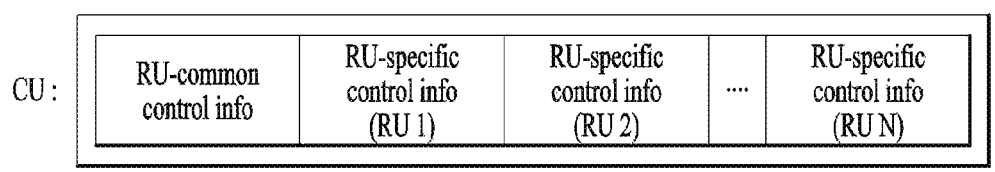
FIG. 13 is a diagram showing another example of configuring an aggregated uplink grant according to a first embodiment of the present disclosure.

FIG. 13 is another example of an aggregated uplink grant configuration according to the first embodiment of the present disclosure.

Referring to FIG. 13, control information that is commonly applicable to all RUs and control information that is assigned differently to individual RUs are distinguished from each other. Then, the commonly applicable control information to the RUs may be transmitted as single information to the entire vehicle user equipment, without redundancy. As a result, the transmission reliability can be improved via efficient control of the control information payload.

Second Embodiment—Uplink Resource Allocation for Vehicle MIMO System

In the case of resource allocation for a vehicle distributed antenna, resources may be allocated such that different RUs included in a single vehicle user equipment may use different time/space/frequency resources to transmit uplink data (Resource allocation scheme ①). Alternatively, resources may be allocated such that, as in the uplink multiple-users MIMO system, different RUs may use the same time/frequency resource to transmit uplink data (Resource allocation scheme ②).

The uplink control information for the vehicle distributed antenna as proposed according to the present disclosure may be configured to include one or more of the information in table 1 below. The uplink control information may be applicable to the two-vehicle distributed antenna resource allocation schemes. In particular, each uplink control information may be divided into RU-common information and RU-specific information. Each control information may correspond to a field that constitutes individual control information and aggregated control information, as shown previously in FIG. 11 and FIG. 13. Further, the division into the RU-common information and RU-specific information may vary according to the vehicle distributed antenna resource allocation scheme.

TABLE 1

|  | Resource allocation scheme ① | Resource allocation scheme ② |
| --- | --- | --- |
| CIF (Carrier Indication Field) | RU-common/ RU-specific | RU-common |

TABLE 1-continued

|  | Resource allocation scheme ① | Resource allocation scheme ② |
|---|---|---|
| UL grant | RU-common/ RU-specific | RU-common |
| TPC | RU-common/ RU-specific | RU-common |
| DM-RS CS (Cyclic Shift) | RU-common | RU-specific |
| CQI/SRS request | RU-specific | RU-common |
| MCS/RV/NDI | RU-specific | RU-specific |
| PMI/RI | RU-specific | RU-common/ RU-specific |
| UL Resource allocation indication flag (1 bit) | | |

In particular, in the uplink control information configuration for the vehicle distributed antennas, when each uplink data transmission resource is allocated to each RU (i.e., resource allocation scheme ①), MCS information and/or PMI and/or RI must be configured in a RU-specific manner. Likewise, when the same uplink data transmission resource is allocated to the RUs (resource allocation scheme ②), DM-RS CS and/or MCS information must be configured in a RU-specific manner.

When different subbands are allocated to RUs and CA (Carrier Aggregation) is applied, CIF should be control information specific to the RU. Otherwise, CIF may be transmitted as RU-common information. Therefore, in the case of the resource allocation scheme ① in which uplink data transmission resources allocated to RUs may be different, CIF may be RU-common information or RU-specific information.

In the case of the resource allocation scheme ②, the same uplink data transmission resource is allocated to all RUs. Therefore, the uplink grant is commonly applicable to a plurality of RUs belonging to the vehicle user equipment. In contrast, in the case of the resource allocation scheme ①, different resources should be allocated to the Rus in a RU-specific manner, and the resources locations should be indicated. However, the uplink grant may be RU-common information. This will be illustrated with reference to the drawings.

Figure 14:
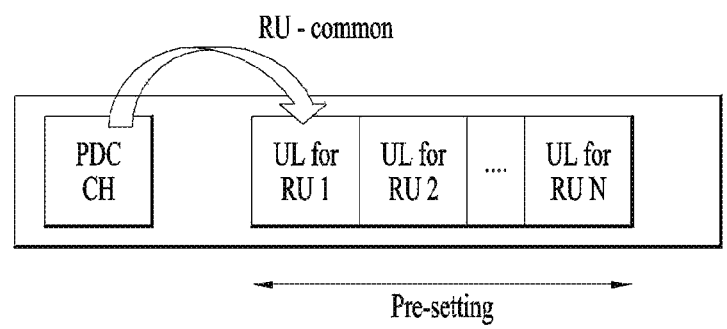
FIG. 14 is a diagram illustrating an example of a RU-common uplink grant according to a second embodiment of the present disclosure.
Figure 15:
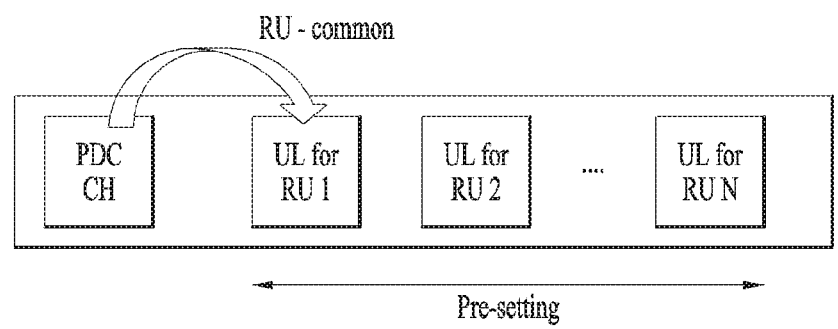
FIG. 15 is a diagram illustrating another example of an RU-common uplink grant according to a second embodiment of the present disclosure.

FIG. 14 is an illustration of an example of an RU-common uplink grant according to the second embodiment of the present disclosure. FIG. 15 is a diagram illustrating another example of an RU-common uplink grant according to the second embodiment of the present disclosure.

Referring to FIG. 14, a scheme may be implemented in which an uplink data transmission resource for any RU is indicated using RU-common information, and the resource is allocated to other RUs within a single vehicle additionally or continuously relative to a predefined transmission resource between the base station and the vehicle user equipment. FIG. 14 shows an example of RU-specific continuous resource allocation scheme. The present disclosure is not limited thereto. As shown in FIG. 15, discrete resource allocation scheme may also be implemented when the scheme is predefined between the vehicle user equipment and the base station.

Further, when RUs use different time/frequency resources, there is no need to distinguish resources on a sequence basis using RU-specific DM-RS CS. Thus, in the case of the resource allocation scheme ①, it may be efficient in terms of performance to consider the DM-RS CS as RU-common information.

MCS (modulation and coding scheme)/RV (Redundancy Version)/NDI (New Data Indicator) may be configured to be RU-specific regardless of the resource allocation scheme. This may be advantageous for performance improvement since RU-specific transmission channel qualities may be different. In one example, there may be a case where the lowest MCS among all MCSs is allocated to all RUs in common, depending on the transmission data characteristics. For a similar reason, it is desirable for performance enhancement that RU-specific PMI/RI information is configured to be specific to RU. However, when the uplink multiple-users MIMO scheme is applied as in the resource allocation scheme ②, a case where MU-PMI information is configured as RU-common information at and after designing the codebook for multiple-users may be considered.

In one embodiment, including 1-bit flag information that indicates which scheme between the two-vehicle distributed antenna resource allocation scheme is applied may allow a plurality of control information formats to be defined based on the resource allocation scheme. The 1-bit flag information refers to the UL resource allocation indication flag field in Table 1. The flag field may be equally applied to the downlink control information configuration.

Third Embodiment—Downlink Control Information and Downlink Resource Allocation for Vehicle MIMO System In the legacy LTE system, the base station determines the MCS level for the PDSCH transmission based on the CQI reported by the user equipment to the base station. The base station transmits downlink control information including MCS information to the user equipment using a downlink grant (PDCCH) scrambled by the C-RNTI. However, in the case of the vehicle user equipment employing distributed antennas, the user equipment reports CQI to the base station in a RU-specific manner. Thus, different MCSs may be allocated to the UE according to the RU channel state with taking into consideration a reception unit such as a layer/codeword (or transport block) allocated to each RU. This may allow obtaining the effect of improving the reception reliability at each DU. When allocating the same layer/codeword (or transport block) to the RUs to improve reliability, the vehicle user equipment may also increase reception reliability via diversity gain.

When the specific vehicle user equipment has a UE type with multiple RUs, and when the base station knows the RU index of the individual RUs, the base station considers each RU as in the case of multiple-users. Thus, the base station may provide RU-aggregated downlink grant to a single vehicle user equipment on a single PDCCH resource. In this connection, the base station may transmit the aggregated downlink grant to the vehicle user equipment using the PDCCH scrambled by the vehicle user equipment ID such as the C-RNTI. To this end, a new DCI format for supporting a multiple-RU operation in the vehicle user equipment must be defined.

In the case of downlink, the control information may be divided into RU-common information and RU-specific information. Such division may vary depending on the resource allocation scheme. The 1-bit flag field for distinguishing between the resource allocation schemes may be applied in the same manner as in table 1. Hereinafter, description will be made mainly about differences between the downlink control information configuration in this embodiment and the uplink control information configuration of the table 1. The downlink control information for the vehicle distributed antennas according to the third embodiment of the present disclosure may be configured to include one or more of the information in table 2 below.

TABLE 2

|  | Resource allocation scheme ① | Resource allocation scheme ② |
|---|---|---|
| CIF | RU-common/ RU-specific | RU-common |
| DL grant | RU-common/ RU-specific | RU-common |
| TPC | RU-specific | RU-common |
| MCS/RV/NDI | RU-specific | RU-specific |
| TPMI/RI | RU-specific | RU-common/ RU-specific |
| HARQ | RU-common/ RU-specific | RU-common/ RU-specific |
| Pw offset | None | RU-common |
| UL Resource allocation indication flag (1 bit) |  |  |

However, in the downlink control information configuration for a vehicle distributed antennas, when different downlink data transmission resources are allocated to RUs (hereinafter, the resource allocation scheme ①), the MCS information must be configured in a RU-specific manner. Further, when the same downlink data transmission resource is allocated to RUs (hereinafter, the resource allocation scheme ②), the power offset and MCS information must be configured in a RU-specific manner.

Further, the HARQ process indicator may be RU-common information or RU-specific information according to the RU-CU functionality sharing configuration. When the RU performs some functions of the physical layer, and when the CU combines the values processed by each RU (e.g., Log-Likelihood Ratio (LLR), hard-value), the HARQ process indicator that may be allocated per transmission unit may be RU-common information. On the other hand, when the RU performs the full function of the physical layer, the data transmission unit is allocated per each RU. Thus, the HARQ process indicator may be considered as RU-specific information.

Further, the power offset is a parameter indicating the ratios between the transmit powers that the base station distributes to multiple-users. As in the resource allocation scheme ① in which different data transmission resources are allocated to RUs, no power offset need be provided.

In the uplink/downlink control information configuration, the payloads for RU-specific information need not be the same between all RUs. The RU-specific information provides only differential values between RUs such that the control information payload may be advantageously reduced.

The description of the present invention is made with reference to the distributed antenna based vehicle communication, by which the present invention is non-limited. And, the present invention is applicable to a general multi-user multi-antenna system in the same manner.

The above-described embodiments are proposed by combining constituent components and characteristics of the present invention according to a predetermined format. The individual constituent components or characteristics should be considered optional on the condition that there is no additional remark. If required, the individual constituent components or characteristics may not be combined with other components or characteristics. In addition, some constituent components and/or characteristics may be combined to implement the embodiments of the present invention. The order of operations disclosed in the embodiments of the present invention may be varied. Some components or characteristics of any embodiment may also be included in other embodiments, or may be replaced with those of the other embodiments as necessary. Moreover, it will be apparent that some claims referring to specific claims may be combined with other claims referring to the other claims other than the specific claims to constitute the embodiment or add new claims by means of amendment after the application is filed.

In this document, a specific operation described as performed by the BS may be performed by an upper node of the BS. Namely, it is apparent that, in a network comprised of a plurality of network nodes including a BS, various operations performed for communication with a UE may be performed by the BS, or network nodes other than the BS. The term BS may be replaced with the terms fixed station, Node B, eNode B (eNB), access point, etc.

The embodiments of the present invention can be implemented by a variety of means, for example, hardware, firmware, software, or a combination thereof. In the case of implementing the present invention by hardware, the present invention can be implemented through application specific aggregated circuits (ASICs), digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. The software code may be stored in a memory unit so as to be driven by a processor. The memory unit may be located inside or outside of the processor, so that it can communicate with the aforementioned processor via a variety of well-known parts.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

An example in which a method for transmitting control information in the distributed antenna communication system as described above and a device for performing the method are applied to a 3GPP LTE system is exemplified. However, the method for transmitting the control information and the device for performing the method may be applied to various wireless communication systems other than the 3GPP LTE system.

The invention claimed is:

1. A method for transmitting control information to a user equipment including distributed antenna units a central unit for controlling the distributed antenna units by a base station in a wireless communication system, the method comprising:
   transmitting distributed antenna units-common control information scrambled by a first identifier; and
   transmitting distributed antenna units-specific control information scrambled by a second identifier,
   wherein the first identifier is an identifier of the user equipment, wherein the second identifier is a specific value determined based on the identifier of the user equipment and an index of each of the distributed antenna units.

2. The method of claim 1, wherein the distributed antenna units-common control information is detected by each of the distributed antenna units using the first identifier.

3. The method of claim 1, wherein the distributed antenna units-common control information is detected by the central unit using the first identifier, and then the detected distributed antenna unit-common control information is transmitted to at least one of the distributed antenna units.

4. The method of claim 1, wherein the distributed antenna units-specific control information is detected by each of the distributed antenna units using the second identifier.

5. The method of claim 1, wherein the method further comprises receiving information about the index of each of the distributed antenna units from the user equipment.

6. A method for receiving control information from a base station by an user equipment including distributed antenna units a central unit for controlling the distributed antenna units in a wireless communication system, the method comprising:
receiving distributed antenna units-common control information scrambled by a first identifier; and
receiving distributed antenna units-specific control information scrambled by a second identifier,
wherein the first identifier is an identifier of the user equipment,
wherein the second identifier is a specific value determined based on the identifier of the user equipment and an index of each of the distributed antenna units.

7. The method of claim 6, wherein the distributed antenna units-common control information is detected by each of the distributed antenna units using the first identifier.

8. The method of claim 6, wherein the distributed antenna units-common control information is detected by the central unit using the first identifier, and then the detected distributed antenna unit-common control information is transmitted to at least one of the distributed antenna units.

9. The method of claim 6, wherein the distributed antenna units-specific control information is detected by each of the distributed antenna units using the second identifier.

10. The method of claim 6, wherein the method further comprises transmitting information about the index of each of the distributed antenna units from the user equipment.

11. An user equipment in a wireless communication system, wherein the user equipment comprises:
distributed antenna units; and
a central unit for controlling the distributed antenna units,
wherein the control unit is configured to detect distributed antenna units-common control information scrambled by a first identifier and to transmit the detected distributed antenna units-common control information to the distributed antenna units,
wherein each of the distributed antenna units is configured to detect distributed antenna units-specific control information scrambled by a second identifier,
wherein the first identifier is an identifier of the user equipment, wherein the second identifier is a specific value determined based on the identifier of the user equipment and an index of each of the distributed antenna units.

* * * * *